Oct. 17, 1933.  W. W. BROWN  1,930,607
TROLLEY CONVEYER LOAD CARRYING HANGER
Filed Sept. 20, 1930  3 Sheets-Sheet 2

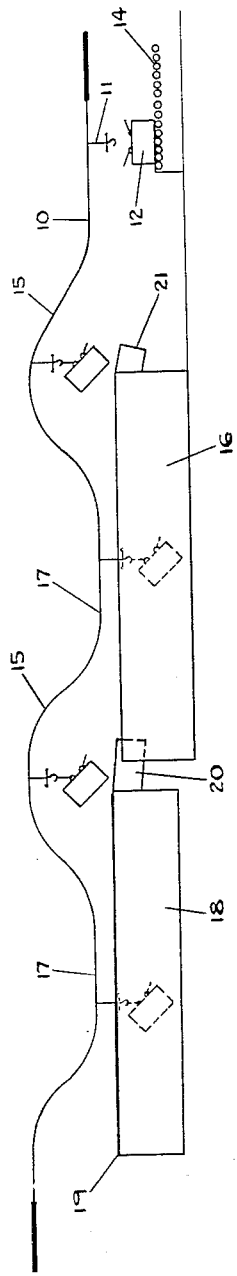
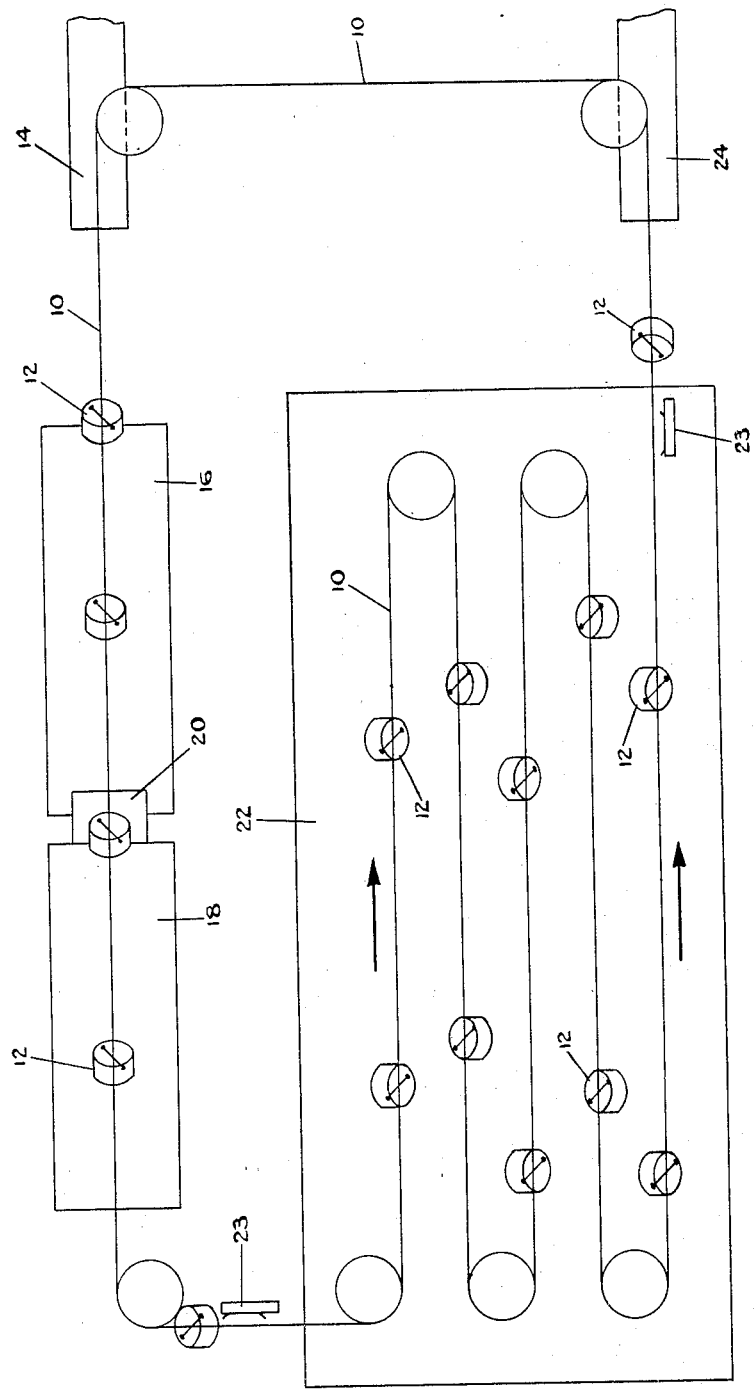

INVENTOR
Walter W. Brown.

Oct. 17, 1933.   W. W. BROWN   1,930,607

TROLLEY CONVEYER LOAD CARRYING HANGER

Filed Sept. 20, 1930    3 Sheets-Sheet 3

INVENTOR
Walter W. Brown.

Patented Oct. 17, 1933

1,930,607

UNITED STATES PATENT OFFICE 1,930,607

TROLLEY CONVEYER LOAD CARRYING HANGER

Walter W. Brown, Columbus, Ohio, assignor to The Jeffrey Manufacturing Company, Columbus, Ohio, a corporation of Ohio Application September 20, 1930
Serial No. 483,359

13 Claims. (Cl. 198—177)

This invention relates to new and useful improvements in transporting devices and more particularly of the trolley conveyer type.

An important object of the invention is to provide a system of transporting objects and treating the same while in transit, in which the objects are presented in different relations to the different treating mediums.

Another important object of the invention is to provide a novel load carrier and hanger therefor to cooperate with trip mechanisms for changing the position of the carriers at intervals during their travel whereby to more effectively treat the objects transported by the carriers.

Other objects and advantages of the invention will become apparent during the course of the following description.

Figure 5:
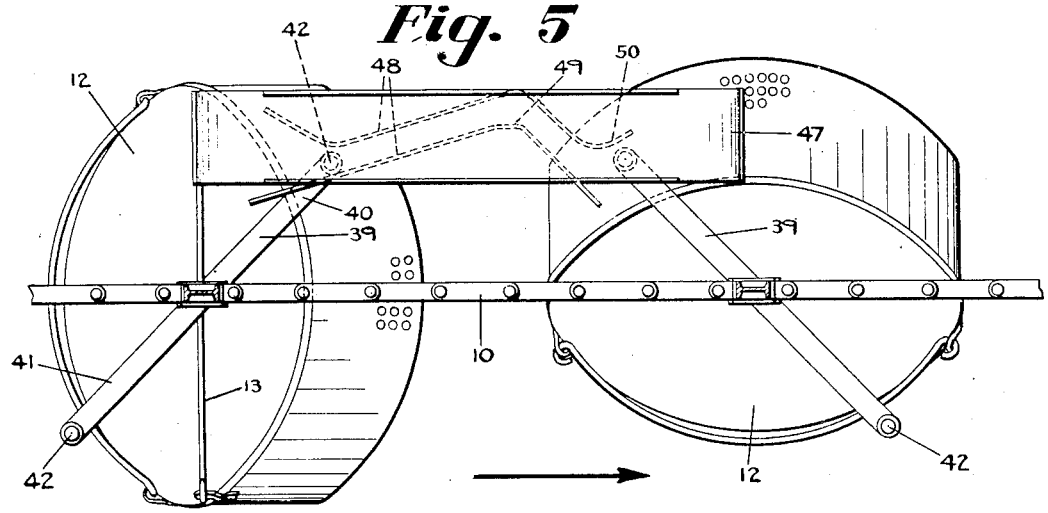
Figure 3:
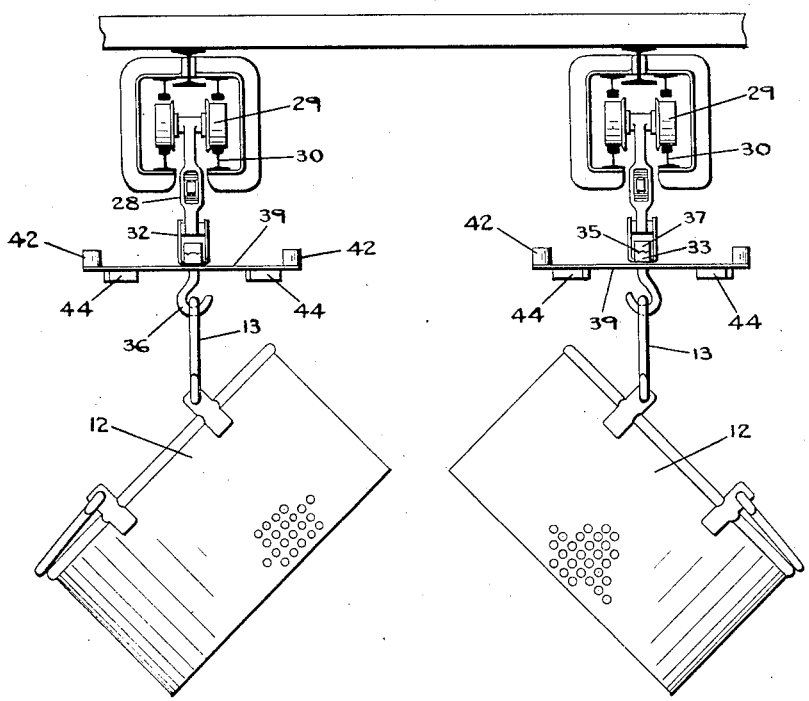
Figure 4:
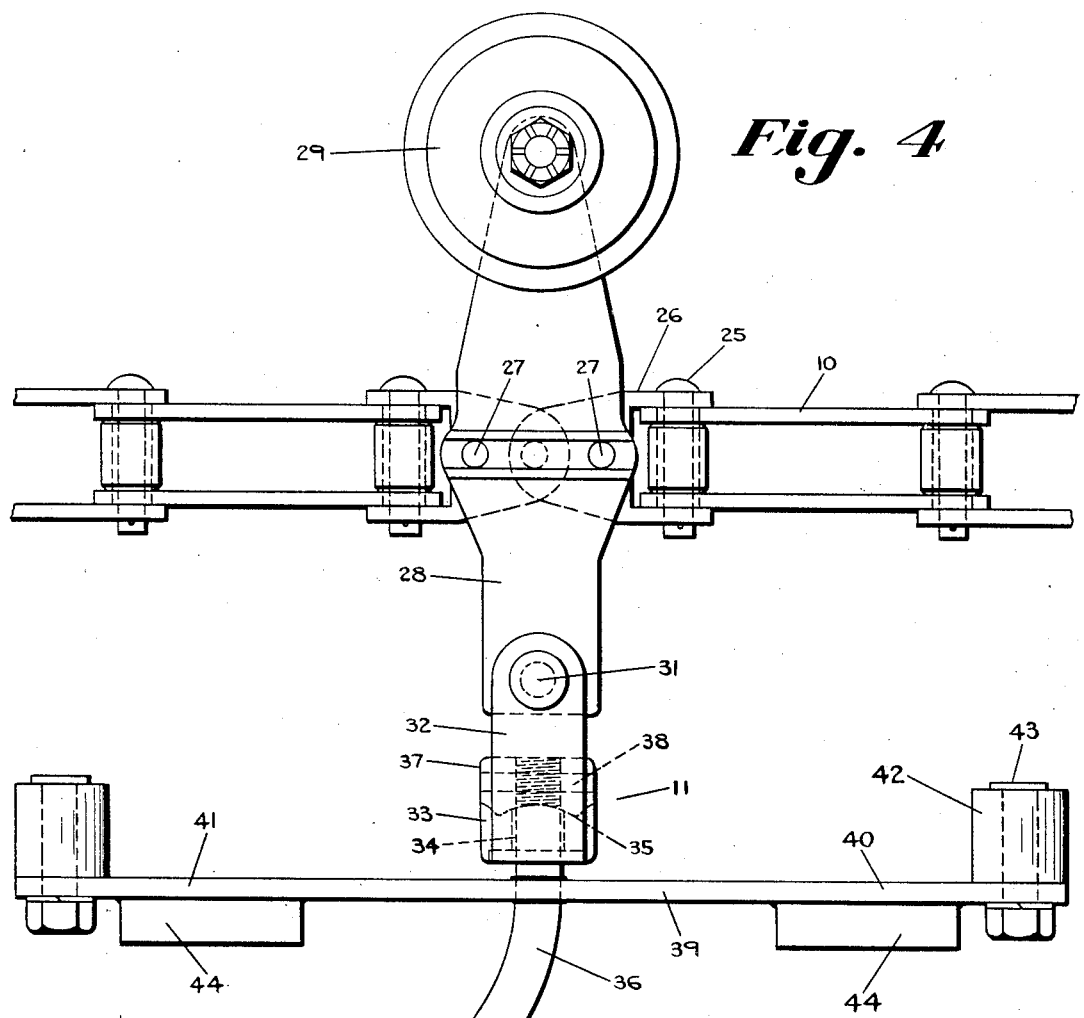
Figure 6:
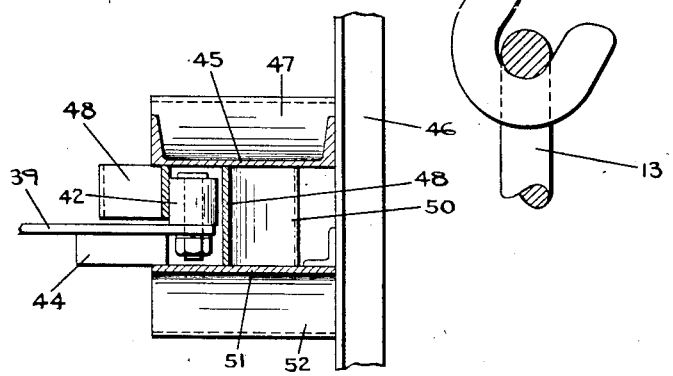

In the accompanying drawings forming a part of the description and wherein like numerals are employed to designate like parts throughout the several figures, Figure 1 is a diagrammatic plan view of the entire system, Figure 2 is a diagrammatic elevation of the liquid tanks and trolley conveyer, Figure 3 is a transverse section through the transporting devices as they pass through an air chamber, Figure 4 is a side elevation of a portion of the conveyer chain showing an associated trolley hanger and load carrier, Figure 5 is a plan view of a portion of the transporting device shown in conjunction with a trip mechanism for turning the conveyers, and Figure 6 is a vertical transverse section through one of the trip mechanisms.

The present improvements, although capable of general application in the art of transporting devices, are particularly adapted for the cooling of canned goods preparatory to the labeling of the cans. As a matter of summary explanation, it may be stated that certain classes of canned goods, such as soups, are cooked in hermetically sealed cans after which they are cooled gradually before the application of labels thereto. The present improvements relate to the apparatus for cooling or otherwise treating these canned goods after being cooked and consists broadly of a transporting device, here shown in the form of an endless chain conveyer 10 of the trolley type for moving a plurality of load carriers 11 in a predetermined circuitous path as shown in Figure 1. A plurality of perforated baskets or containers 12 are employed for transporting a plurality of cans of goods through the system, each container when filled with the canned goods, weighing in the neighborhood of eight hundred to one thousand pounds. These containers 12 have their bottoms and sides perforated as shown and their upper open tops are provided with a pair of hinged bales 13 pivoted to the container at opposite sides of its normal center of gravity so that when both of these bars are suspended from a common suspension hook, the container is supported with its bottom horizontal, but when suspended from only one of the bars, is tilted as shown.

These containers 12 are brought beneath the trolley conveyer 10 from the cooking apparatus by means of a gravity conveyer 14 where the leading bale 13 is swung upwardly to become automatically engaged with a traveling load carrier 11, which moves the container off of the gravity conveyer 14 and suspends the same with its bottom inclined in the direction of advance of the trolley conveyer 10. This conveyer is elevated as at 15 to raise the containers 12 over one end of a water tank 16 and is thereafter provided with a depressed portion 17 whereby the containers are lowered into the water or other suitable cooling medium within the tank 16. This depressed portion of the conveyer extends horizontally a substantial distance lengthwise of the tank 16 whereby the containers are caused to move longitudinally through the cooling medium with their bottoms inclined in the direction of advance of the conveyer. After traversing this tank 16, the containers are lifted from this tank and carried over to be immersed and moved through the cooling medium in a second tank 18 by means of elevated and depressed portions 15 and 17 respectively of the trolley conveyer. Water or other suitable cooling medium is admitted into the tank 18 at a point 19 and is permitted to flow from one tank to another by the chute 20 and after passing through the tank 16 is discharged at 21. As it is not desirable to cool such canned goods too rapidly, the water or other cooling medium in the tank 16 is warmer than that in the tank 18 and is maintained so in spite of the circulation between them by reason of the fact that the canned goods are hottest when submerged in tank 16 whereby the medium therein is maintained at a higher temperature than the medium in the tank 18 where the canned goods are subsequently immersed and further cooled.

After passing through the cooling tanks, the containers 12 are then directed into an air cooled compartment 22 but before being entered therein, their position with respect to the trolley conveyer is automatically changed. In passing through the cooling tanks, the bottoms of these containers 12 are tilted in the direction of their advance by the particular suspension means disclosed, but in passing these containers through the air cooled compartment 22, it is found desirable to turn the air containers through an angle of approximately ninety degrees by a trip mechanism 23 so that they will be tilted sidewise as shown in Figure 3 so that the bottoms of the containers in advance will not obstruct the movement of air currents through the trailing containers. The trolley conveyer 10 is arranged in a serpentine path within the compartment 22 so that the containers are caused to move from one end to the other several times to have the temperature of the canned goods further reduced preparatory to the transportation thereof to the labeling department. In order that the containers 12 may be turned to facilitate their discharge from the trolley conveyer onto a gravity conveyer 24, a second trip mechanism 23 is arranged adjacent the path of movement of the conveyer adjacent the outlet end of the air cooled compartment 22 which serves to turn the container 12 back through an arc of approximately ninety degrees so that their bottoms are again tilted in the direction of the advance of the conveyer and can be pulled onto the gravity conveyer 24 where the bales 13 are disengaged from the load carriers 11. At this point, the gravity conveyer 24 transfers the detached containers 12 to a labeling room or other suitable point of discharge while the trolley conveyer moves on through its circuit back to a point above the loading gravity conveyer 14 to repeat the cycle of operations.

Although any desired form of trolley conveyer 10 may be employed, I have illustrated the type embodying a chain composed of links united on vertical axes 25 which at intervals are joined to pairs of clevises 26 pivotally connected on horizontal axes as at 27 to the body of a trolley hanger 28. The inner ends of the clevises within the hanger cooperate so that movement of one of the clevises 26 will cause corresponding angular movement of the other clevis at the opposite side of the hanger. These trolley hangers 28 are, of course, provided with wheels 29 to run on an overhead track 30 suspended from the structural work of the building or from any other suitable support.

Suspended from each trolley hanger 28 at its lower end by means of a horizontal rivet pin 31 is a U-shaped yoke or clevis 32 having its hub or bridge portion 33 provided with a central aperture 34 surrounded by a plurality of radially disposed V-shaped seats or serrations 35. These recesses or serrations are disposed so as to retain the containers 12 at one or the other of its two positions hereinbefore explained.

The load carrier, in the present illustration of the invention, and which is designated in general by the numeral 11, consists of a hook 36 adapted to suspend the container 12 by one of its bales 13. The shank of the hook 36 is extended through the aperture 34 in the clevis 32 and is screw threaded to receive a head 37 having its lower face provided with radial V-shaped recesses and projections complementary to the recesses or serrations 35 to cooperate therewith. A pin 38 may be passed through this head and the upper end of the hook shank to prevent accidental rotation or displacement of the head 37. By this construction, the load carrying hook 36 is swively suspended on a vertical axis from the trolley hanger and is restrained from turning when in either one of its predetermined angular positions as hereinbefore explained.

Beneath the clevis 32, an elongated bar or arm 39 is welded to the shank of the hook to extend substantial distances from opposite sides of the hook as shown. The normal disposition of these arms 39 of the load carriers is at approximately forty-five degrees to the endless conveyer chain 10 as shown best in Figure 5 with one end 40 as a leading end and its opposite end 41 as a trailing end. A roller 42 is journaled on a vertical bolt 43 on top of each end of the bar and a sliding bearing block 44 is secured to the underside of the arm adjacent each end as best appreciated from Figure 4.

The trip mechanisms 23 hereinbefore described are shown in detail in Figures 5 and 6 and each comprises a horizontal channel bar 45 having its flanges turned upwardly with the inside flange secured to suitable framework 46 adjacent the path of travel of the endless conveyer 10. The two ends 47 of this bar are turned upwardly to prevent the arms 39 catching at the corners. A cam trip device for automatically reversing the angular position of the arms 39 with respect to the endless conveyer consists of a pair of vertical horizontally spaced parallel plates 48 having their intermediate portions inclined outwardly and inwardly with respect to the conveyer chain 10 to provide a guideway having an apex or offset portion 49 guiding the rollers 42 of the arms 39. The extreme ends 50 of these plates 48 are flared outwardly to provide ready guidance of the rollers 42 into the trip groove. Immediately beneath the innermost plate 48 and secured to the framework 46 in any suitable manner is a horizontal guide and supporting plate 51 having its ends 52 bent downwardly as shown to remove obstructions from the movement of the load carrier arms 39. In Figure 6, it will be noted that this horizontal plate 51 extends a substantial distance below the outer trip plate 48 to provide suitable clearance for the projection of the arm 39 with the bearing block 44 sliding upon the plate 51 to retain the roller 42 in proper engagement with the trip plates 48.

As stated previously, when the containers 12 are being moved horizontally and vertically, their bottoms will be tilted in the direction of advance of the endless conveyer 10 and the arms 39 will be positioned at approximately forty-five degrees with respect to the chain 10 with the roller 42 of the advance end 40 of the arm in position to first engage in the trip groove defined by the plates 48. Referring to Figure 5 and assuming that the trolley conveyer is moving in the direction of the arrow, it will be evident that upon movement of the chain in this direction the roller 42 on the leading end of the arm 39 will move between the plates 48 causing the arm of the load carrier to gradually swing counter-clockwise. When the roller 42 reaches the apex 49 of the trip, the arm 39 of the load carrier will be arranged at substantially right angles to the trolley chain 10 and upon further movement of the trolley chain to the right of this figure, the trip plates 48 will engage the roller 42 and cause the arm 39 to complete its movement through an arc of approximately ninety degrees so that the roller 42 will be transformed into the trailing roller and the roller at the opposite end of the arm will then assume the role of the leading end. During this ninety degree travel of the arm 39, the container 12 suspended from the hook 36 will be moved through an arc of substantially ninety degrees so that the perforated bottom of this container is then inclined laterally at the side of the trolley chain instead of being inclined in the direction of the chain so as to be disposed in proper position to move through the air in compartment 22 and not interfere with the free passage of air currents through the trailing containers.

In order to re-position the containers 12 to their original positions with their bottoms tilted in the direction of advance of the conveyer, a similar trip mechanism 23 is provided on the opposite side of the conveyer chain adjacent the outlet end of the compartment 22 and in this manner the containers are properly turned so that their bottoms are inclined to ride up onto the gravity conveyer 24, to be released from the carriers.

It will, of course, be understood that various changes in the construction and arrangement of the various parts may be resorted to without departing from the scope of the appended claims.

I claim:

1. A transporting apparatus for conveying material through a treating medium, said apparatus comprising a hanger movable in a predetermined path, a material holding receptacle having a perforated bottom, and a supporting element on said receptacle offset from a transversely extending axial plane of said receptacle, said element being connected to said hanger to support said receptacle with said perforated bottom facing forwardly and inclined upwardly in the direction of travel of said hanger, whereby said treating medium is caused to circulate through the perforation in the bottom of said receptacle by movement of said receptacle therethrough, to cause intimate contact between said material and said medium.

2. A transporting apparatus for conveying material through a treating medium, said apparatus comprising a hanger movable in a predetermined path, a material holding receptacle having a perforated bottom, and a bail having its ends connected to said receptacle on a line disposed forwardly of a transversely extending axial plane of said receptacle, said bail being connected to said hanger to support said receptacle with said perforated bottom facing forwardly and inclined upwardly in the direction of travel of said hanger, whereby said treating medium is caused to circulate through the perforations in the bottom of said receptacle by movement of said receptacle therethrough, to cause intimate contact between said material and said medium.

3. In a transporting device, a load carrier movable in a predetermined path, means for causing said carrier to periodically assume different predetermined angular positions relative to its direction of advance, said means comprising a part movable with said load carrier and a relatively stationary part, and means for releasably retaining said load carrier in said positions when moving horizontally and vertically.

4. In a transporting device, a hanger movable in a predetermined path, a load carrier swivelly associated with the hanger, complementary faces on the hanger and carrier for releasably retaining said carrier in various angular positions, and means for causing the carrier to pivot on its swivel axis at predetermined times during its travel.

5. In a transporting device, the combination with a load carrier movable in a predetermined path, of means for causing said carrier to move through an arc of predetermined extent on a vertical axis at intervals during its travel, said means comprising a part on said load carrier and movable therewith and a relatively stationary member positioned adjacent said path in cooperative relation to said part on said carrier, and means for retaining said carrier in predetermined position after the same has been moved through said arc of predetermined extent.

6. In a transporting device, a hanger movable in a predetermined path, a load carrier swivelly associated with the hanger, a trip arm extending from said carrier, and trip means engageable with said arm for turning said carrier through an arc on a vertical axis at an interval during its travel, said trip means supporting and guiding said carrier arm.

7. In a transporting device, a hanger movable in a predetermined path, a load carrier swivelly associated with the hanger, a trip arm extending from said carrier on opposite sides of its axis, and cam means engageable with one end of said arm at one interval to turn said carrier through an arc on its vertical axis and engageable with the opposite end of said arm at another interval to return said carrier to its normal position during its travel.

8. In a transporting device, a hanger movable in a predetermined path, a load carrier swivelly associated with the hanger and having an arm normally disposed obliquely to the path of movement of the carrier with one end leading and the other trailing, and cam means engageable with the leading end of said arm at one interval to turn said carrier through an arc on its vertical axis and engageable with the opposite end of said arm at another interval to return said carrier to its normal position during its travel.

9. In a transporting device, a hanger movable in a predetermined path, a load carrier swivelly associated with the hanger, a trip arm extending from said carrier, and cam means engageable with said arm for turning said carrier through an arc on a vertical axis at an interval during its travel, said cam means including a pair of horizontal vertically spaced guide plates, and a pair of vertical horizontally spaced parallel strips forming a cam slot arranged between said plates.

10. In a transporting device, a hanger movable in a predetermined path, a load carrier swivelly associated with the hanger, a trip arm extending from said carrier, and cam means engageable with said arm for turning said carrier through an arc on a vertical axis at an interval during its travel, said cam means including a pair of horizontal vertically spaced guide plates and a pair of vertical horizontally spaced parallel strips forming a cam slot arranged between said plates, said lower guide plate being engageable by the end of said arm in traversing said cam slot for supporting the same.

11. In a transporting device, a hanger movable in a predetermined path, a load carrier including a clevis pivotally connected to the hanger on a horizontal axis, said clevis having an apertured bridge provided with radial recesses, and a load supporting element extending through said aperture and having a head above said bridge provided with complementary radial projections.

12. In a transporting device, a hanger movable in a predetermined path, a load carrier swivelly associated with the hanger, a trip arm extending from said carrier on opposite sides of its axis, the ends of said arm having rollers and sliding bearings, and cam means engageable with said rollers and sliding bearings.

13. In a transporting apparatus, a hanger movable in a predetermined path, a load carrier swivelly supported by said hanger for rotation on a vertical axis, an arm extending from said carrier and having a cam follower disposed thereon, a pair of substantially parallel cam surfaces extending along the path of movement of said hanger and disposed to receive the follower therebetween, the relation of said cam surfaces to the path of movement of said hanger serving to turn said arm and said load carrier through an arc on said axis as said carrier travels along said path, said turning being effected by camming forces directed to said follower first from one direction by one of said surfaces, and then from substantially the opposite direction by the other of said surfaces.

WALTER W. BROWN.